Figure 12:
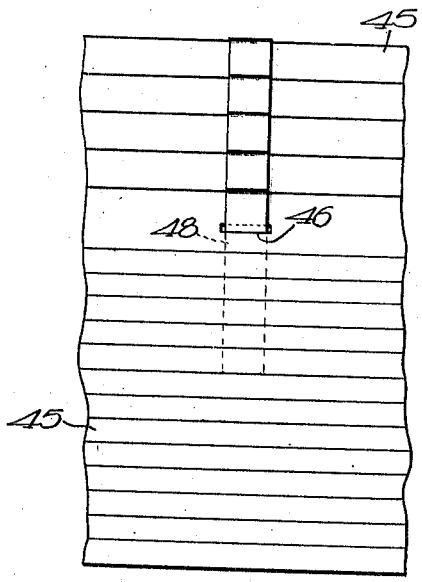

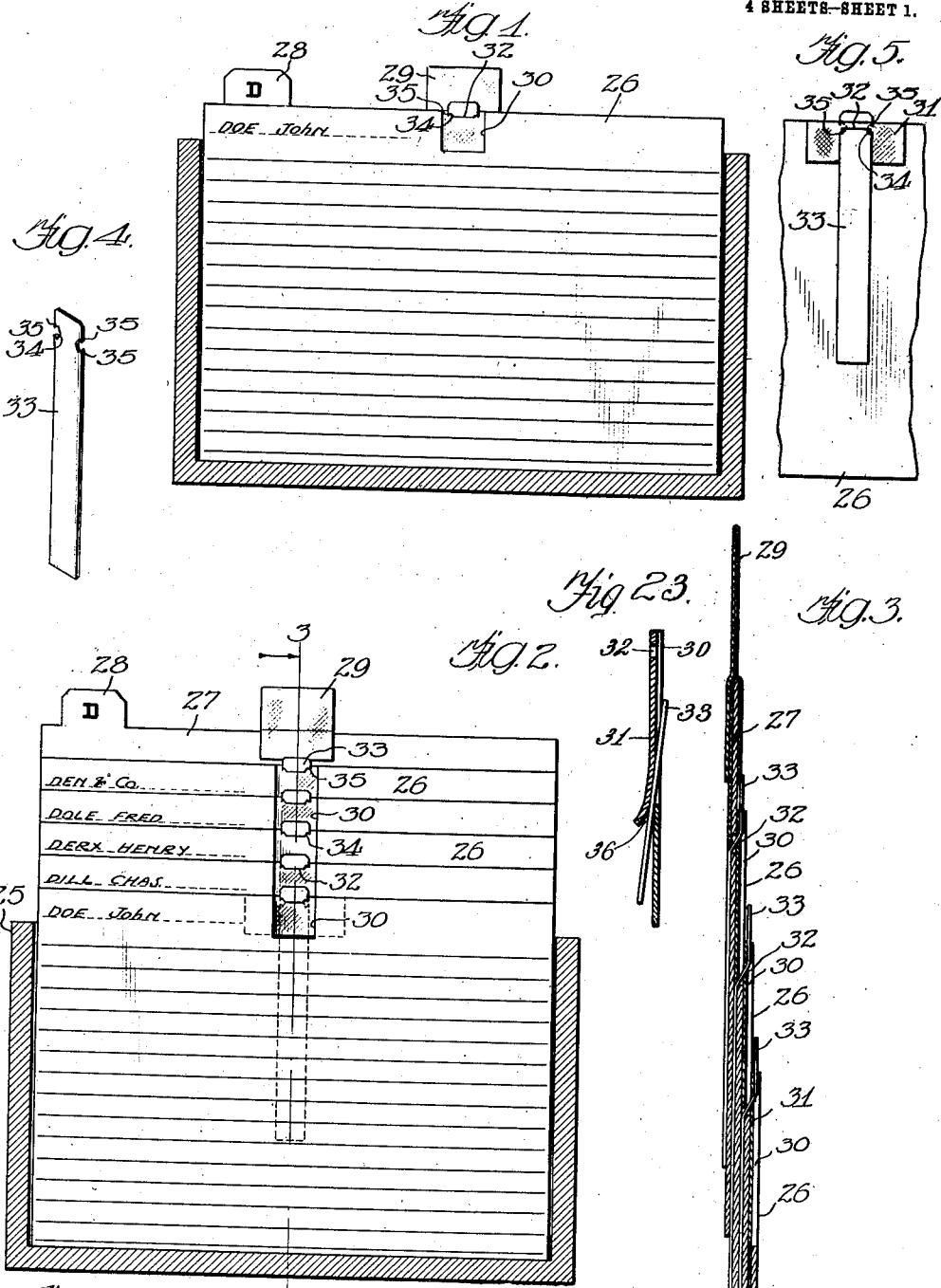

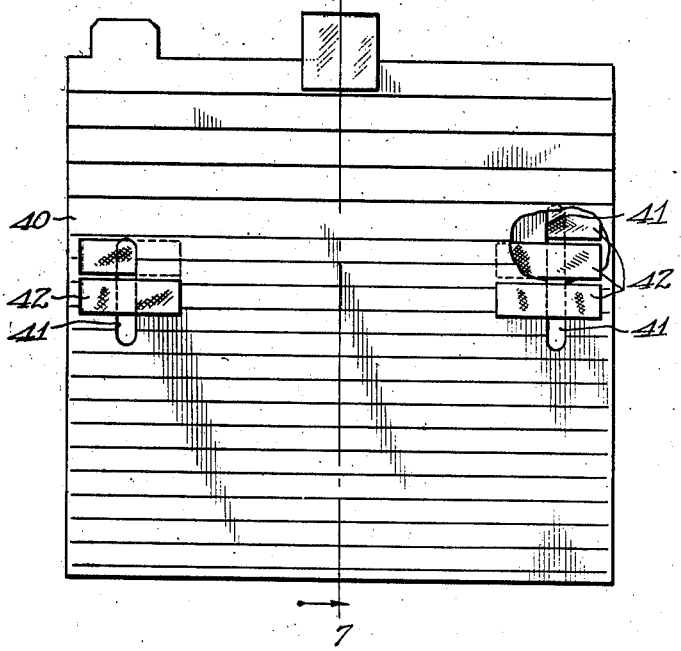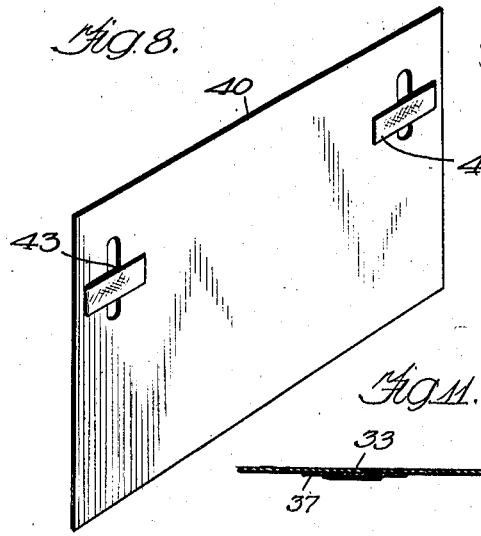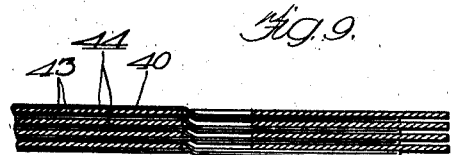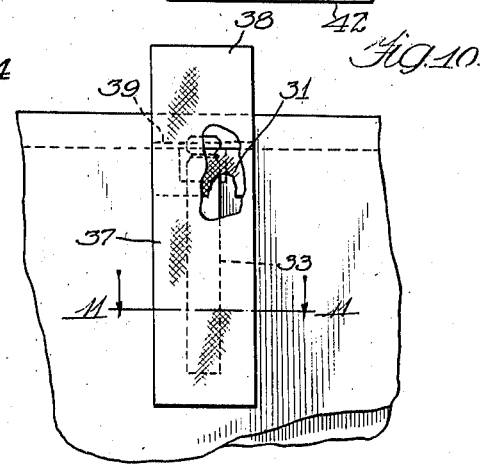

T. WALLER.
SYSTEM OF FILES.
APPLICATION FILED NOV. 24, 1908.

972,302.

Patented Oct. 11, 1910
4 SHEETS—SHEET 3.

Witnesses:
Inventor:
Trigg Waller
by O. R. Barnett
Atty.

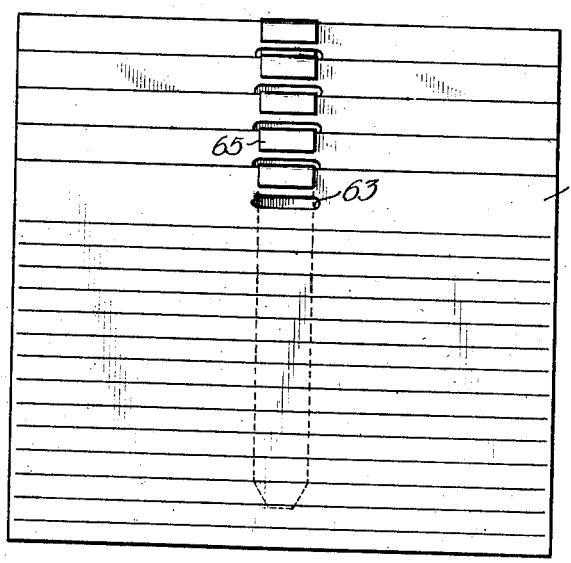
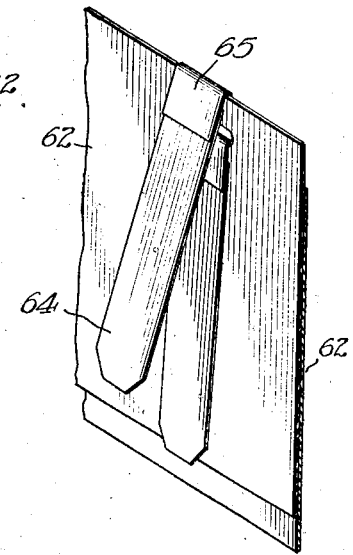
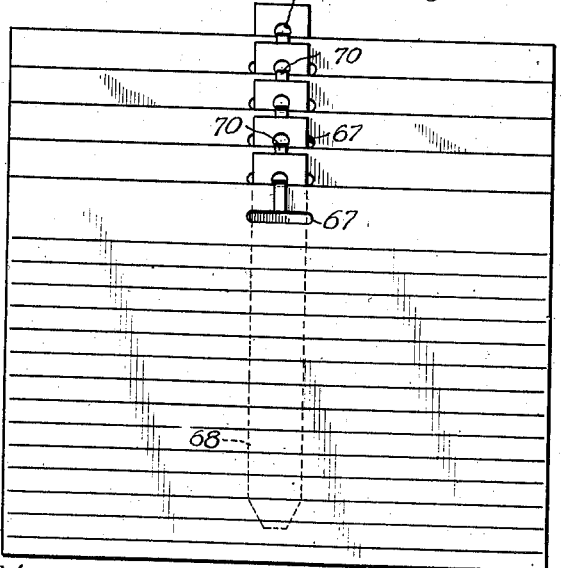
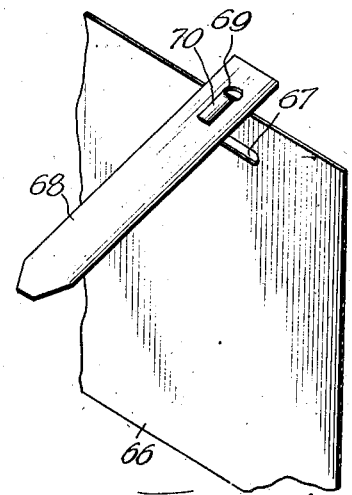

UNITED STATES PATENT OFFICE.

TRIGG WALLER, OF HIGHLAND PARK, ILLINOIS.

SYSTEM OF FILES.

972,302.  Specification of Letters Patent.  Patented Oct. 11, 1910.

Application filed November 24, 1908. Serial No. 464,305.

*To all whom it may concern:*

Be it known that I, TRIGG WALLER, a citizen of the United States, residing at Highland Park, in the county of Lake and State of Illinois, have invented certain new and useful Improvements in Systems of Files, of which the following is a specification.

My invention relates to a system of files, in which the files are movably and detachably connected together, so that they lie one back of the other when in the case, but which will fall one below the other so as to expose a part of each file when taken from the case.

The object of the invention is to provide the files of such a system, with connecting or interlocking means which will be durable, allow any of the files to be easily examined without detachment, simplify the re-attachment of the files after separation, or the addition of new files, which will eliminate or lessen the liability to error and confusion in handling the files, diminish the aggregate thickness of the files when lying one behind the other as much as is consistent with the strength and durability of the attaching means, and, in general, to improve such a filing system and make it of practical value.

A special object of the invention is to provide the files each with an interlocking tongue made of a separate piece of material, preferably stronger than the paper or other material of the file, and to hinge the same to the file by means of a tough but flexible fabric which will allow the tongue to be manipulated freely and at the same time will stand the continual wear and bending, which the device must be subjected to in practical use.

Another special object of the invention is to provide the slot in the file which receives the tongue of the next succeeding file with a guard which will prevent such tongue being accidentally thrust through the slot of the file beyond, and which will also serve to prevent the files from falling apart when they are lifted out of the case.

Another object of the invention is to provide a paper file, as, for example, a card, with a tongue of metal which shall be securely hinged to said file.
Another object of the invention is to construct the file, the hinge and their connecting means so that the aggregate thickness of the files when in position in the case is not materially increased by the means used for interlocking the files.

The invention has for further objects such new and improved constructions, arrangements and devices in systems of interlocking files as will be described in the following specification and particularly set forth in the claims appended thereto.

The invention, in several typical and illustrative embodiments is shown in the accompanying drawings, in which—

Figure 13:
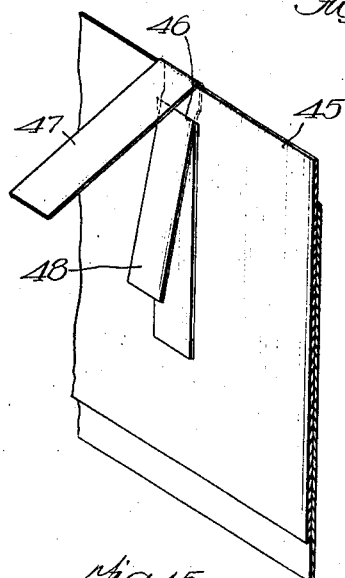
Figures 14, 15:
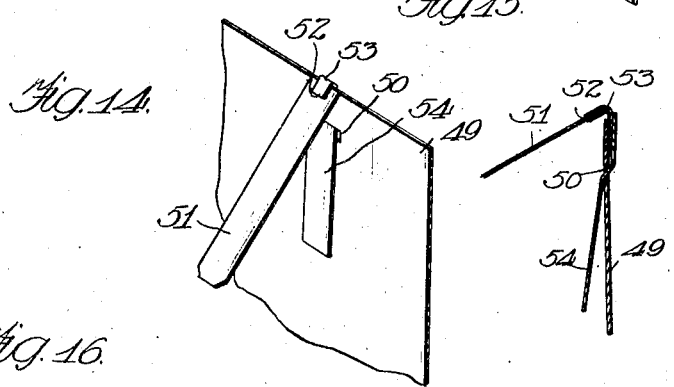
Figure 16:
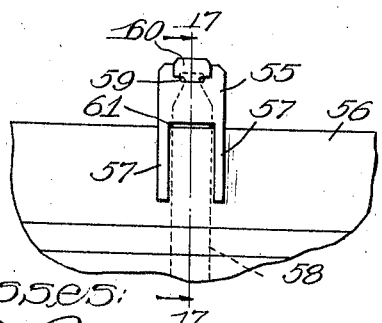
Figure 17:
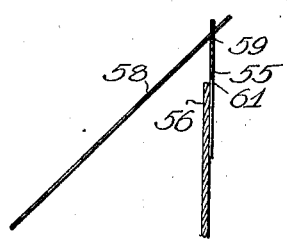

Figure 1 is a vertical, sectional elevation of a case of interlocked files showing the files collapsed one back of the other. Fig. 2 is a similar view with the files extended so as to expose an index portion of the same. Fig. 3 is a section on line 3—3 of Fig. 2, but on a larger scale and with certain features of construction accentuated for the purpose of clearness of illustration. Fig. 4 is a perspective view of one form of tongue. Fig. 5 is a detail elevation of the back of a file. Fig. 6 is a front elevation of a modified form of filing system. Fig. 7 is a section on line 7—7 of Fig. 6, looking in the direction of the arrows, the thickness of the parts being accentuated to more clearly show their construction and arrangement. Fig. 8 is a perspective view of one of the files shown in the previous two figures. Fig. 9 is a partial section through the system of files illustrated in Figs. 6, 7 and 8, but with the files collapsed, the section being taken through the interlocking means at one side of the files. Fig. 10 is a partial elevation of the back of a file showing a modification or supplemental feature particularly applicable to the index card of a system of files. Fig. 11 is a section on line 11—11 of Fig. 10, looking in the direction of the arrows. Fig. 12 is a partial front elevation illustrating another form of interlocking means. Fig. 13 is a detail in perspective of one of the files shown in Fig. 12. Fig. 14 is a similar perspective view illustrating another modification. Fig. 15 is a vertical section taken through the file of this latter modification. Fig. 16 is a detail elevation illustrating a further modification. Fig. 17 is a section taken on line 17—17 of Fig. 16. Fig. 18 is a front elevation of a differently constructed system of files. Fig. 19 is a detail in perspective of the file of this latter character. Fig. 20 is a view similar to Fig. 18 illustrating a further modification. Fig. 21 is a detail in perspective of a file of this construction; and Fig. 22 is a vertical section through the upper part of the file, tongue and hinge of the construction shown in Figs. 20 and 21. Fig. 23 is a detail sectional view showing the tongue 33 in its relation to the card.

Like characters of reference indicate like parts throughout the several figures of the drawings.

Referring first to Figs. 1 to 5 inclusive, 25 represents a case and 26 a number of files which are here shown as the cards of a card file. The cards may be arranged in the case in classes, for example, alphabetically, and each class may be provided with an index card, such as 27, provided with an index tab 28 for an initial letter, and a lifting tab 29. In the arrangements shown, the cards of any given class are interlocked together and are connected with their appropriate index card, so that by taking hold of the lifting tab of the index card, all of the cards of the class may be lifted from or taken out of the case together, the cards, it will be understood, being so connected one with another that they fall one below the other so as to expose the upper portion of each card as is clearly shown in Fig. 2. I have devised various means for obtaining this movable interlocking or interconnection of the cards, which, it will be understood, should be of such a character as to allow any of the cards to be detached, and which should also permit the cards lying over any given card to be turned back, so that such card may be examined without detachment. In these first five figures, each of the cards 26 is cut away on its upper margin, so as to form a notch 30 and over this notch, on the back of the card, is pasted a strip of material 31 preferably of some tough but flexible cloth. This strip of cloth has the slot 32 through which extends the upper end of the interlocking tongue 33, which is reduced at this point by the notches 34, the projecting shoulders above and below the notches being preferably provided with the points 35. The head of the tongue may be bent slightly before it is thrust through the slit in the cloth and then, when it is bent back, the tongue will be prevented from slipping out of place, the points 35 aiding in this respect. A tongue of this construction may be, and preferably is, made of some very thin, light material, such as aluminum.

The strip of cloth 31 is left free from the card below the slot and pasted down on the card at the sides, thus leaving a space 36 for the reception of the tongue of the card next in front of it. The arrangement of one card upon the other is illustrated in Fig. 3, where, it will be understood, the thickness of the parts is very considerably exaggerated, so that, in consequence, the tongues have to be shown as bent. In practice there will be no appreciable bend in the tongues. The lifting tab 29 on index card 27 may be made by folding a piece of tough fabric and pasting its ends down on opposite sides of the card, as shown in Fig. 3. The index card need not be provided with a tongue, unless it is desired that the different classes of cards should be linked together, as well as all the cards of a given class. The strips 31 on the back of the cards are preferably carried far enough down the cards so as to prevent the tongues of the cards in front of them from turning on their hinges, so as to cause the separation of the files, which is likely to happen if the cards are heavy or if there are a good many on a string. The strips also prevent the tongue of a card from being thrust through the slots or spaces in a file beyond the one to which the card is to be attached. The head of the tongue beyond the hinging point makes it easy to manipulate the tongue in making the attachment. The hinge between the card and tongue works very freely. If it is desired to examine any card in the middle of the string, all of the cards in front of it may be turned back. As this will be done constantly in files which are in continual use, it is important that the hinge between the tongue and the file should be such as will stand wear.

If desired, the lifting tab might be applied to the back card of the class and the index card left in the case to mark the place of the class when removed; or, if it is not desirable to attach the lifting tab to one of the files, it could be attached to a separate card made for that purpose.

In Figs. 10 and 11 I have shown a construction which is particularly suitable for the back card of any given class, this construction being a modification of the construction of the first five figures, although the same feature might be employed with a different construction of tongue and slot. Instead of the attaching tab or strip 31, I employ an elongated strip 37, which forms a pocket for the tongue 33. This strip may be made to extend beyond the card to form a lifting tab 38 and may be carried over and pasted down on the opposite side of the card, as indicated by the dotted line 39. In Fig. 10 the parts are broken away so as to show in full lines part of the tongue 33 and part of the attaching tab 31 of the next card. The pocket formed by the piece 37 incloses the tongue 33, so as to prevent it from turning on its hinge and so as to prevent it from interfering with anything when the collapsed string of files is put back in the case.

In Figs. 6 to 9 inclusive I have shown a different form of interlocking means which, however, does not permit the cards to be folded back as conveniently as in the system shown in the preceding figures. In this case the cards 40 are provided on each side with the slots 41 and with the transverse tongues 42 which, for secure attachment, may be formed of double thickness, the ends 43, 44 being pasted to opposite sides of the card, as shown in Figs. 8 and 9. The tongues of each card will be thrust through the slots of the card next following, which can be done by bending the parts.

Figs. 12 and 13 illustrate a modified construction in which the card 45 is provided with a slot 46 through which is passed a strip of material extending over the margin of the card, one end of this strip 47 constituting the interlocking tongue and the other, 48, which extends through slot 46 and lies back of the card, constituting a guard or guide which prevents the tongue on the next card in advance from being thrust accidentally into the slot in the card beyond. The parts 47, 48 may be made of a single piece of stiff cardboard.

Figs. 14 and 15 illustrate a somewhat similar construction employing, however, a separate, preferably metal, tongue and a fabric hinge for the same. The card 49 is slotted at 50. The tongue 51 has a slot 52 through which passes a strip of cloth 53, the ends of which are pasted down on the front of the card. A strip of cardboard 54 is attached to the front of the card and extends through slot 50.

Figs. 16 and 17 provide an attaching tab which projects beyond the card, so that the hinging of the tongues does not increase the aggregate thickness of the files as a whole. In this respect this construction is of the same character as the construction shown in Fig. 1, in which the attaching tab is set into the card. The attaching tab 55 is secured to the card 56 by two projecting strips 57, which are preferably spaced apart the width of the tongue 58. Tab 55 has the slot 59, and the tongue the head 60. The tongue may be slipped into the slot by bending the head a trifle. A slot or space 61 intervenes between the tab and the card through which the tongue on the next card may be thrust. In this construction it is not necessary to perforate the card. The interlocking of the cards adds to the aggregate thickness of the string of cards only to the extent of the thickness of the tongues or strips 57.

Figs. 18 and 19 show a very simple construction in which the cards 62 are slotted at 63 and provided with tongues 64, preferably of cardboard, which are attached to the cards by means of the fabric hinges 65.

The above construction is modified in Figs. 20, 21 and 22, which provide a tongue having a projecting end, making it easier of manipulation and preventing the cards from catching on the edges of the slots of adjacent cards, which is likely to happen with the construction shown in Figs. 18 and 19, particularly after the cards have become a little worn. In these last three figures the card 66 has the slot 67 and the tongue 68 is perforated at 69 for the hinge strip 70, which is pasted down on the front of the card. The upper end of tongue 68, projecting beyond the upper edge of the slot, serves as a guide to its card when the string of cards is collapsed. This part also forms a tab which is convenient in making the attachment with the card which comes before in the system.

I do not limit myself to the particular devices, constructions and arrangements shown and described, as modifications might be devised which would come within my invention as defined by the claims.

Certain of the devices and arrangements shown in separate figures of the drawings might obviously be employed in conjunction, but, as it would not be possible to illustrate every possible combination of such devices without unduly increasing the number of illustrations, I have attempted merely to show in one figure or another the various improvements which constitute the objects of my invention.

I have used in the specification and claims the word tongue to signify the engaging member which is movably connected with the body of the file, but I do not intend thereby any particular form of device. The proportions of the tongue can be varied at will.

I claim:

1. In a system of interlocking files, a file made of paper, and a separately formed tongue for said file adapted to interlock with another file and provided with a hinge-forming portion of tougher material than paper, whereby it may be movably secured to said first mentioned file.

2. In a system of interlocking files, a file made of paper, and a separately formed interlocking device for said file adapted to interlock with another file and provided with a hinge-forming portion of tougher material than paper, whereby it may be movably secured to said first mentioned file.

3. In a system of interlocking files, a paper file, a metal tongue movably secured to the file and adapted to removably interlock with another file.

4. In a system of interlocking files, a file, a separate tongue for the same, and attaching means made of cloth for attaching the tongue to the file said tongue being adapted to removably interlock with another file.

5. In a system of interlocking files, a file of paper, a tongue for the same of metal, and a cloth device for hinging the tongue to the file said tongue being adapted to removably interlock with another file.

6. In a system of interlocking files, a file, a separate tongue for the same, and at attaching tab for connecting the tongue to the file, a part of which does not overlie the file, the tongue being attached to such part and adapted to interlock with another file.

7. In a system of interlocking files, a file, a separate tongue of the same, and a strip of cloth secured to the file, a part of which does not overlie the file, the tongue being attached to such part and adapted to interlock with another file.

8. In a system of interlocking files, a file of paper, a metal interlocking tongue, and a cloth attaching tab provided with a slot in which the tongue is hinged.

9. In a system of interlocking files, a file of paper, a metal interlocking tongue, and a cloth attaching tab provided with a slot in which the tongue is hinged, said tongue provided with shoulders having points which prevent the tongue from being withdrawn from the tab.

10. In a system of interlocking files, a file, a separately formed tongue adapted to engage with a file on one side of said file, and means for attaching the tongue to the file, which means, with the first mentioned file, provides an engagement for the tongue of a file on the other side of said first mentioned file.

11. In a system of interlocking files, a file, a separately formed tongue for the same adapted to engage with a file on one side of said file, and an attaching tab for the tongue secured to one side of the first mentioned file and which, with said first mentioned file, constitutes an engagement for the tongue of a file on the other side thereof.

12. In a system of interlocking files, a file, a separately formed tongue for the same adapted to engage with a file on one side of said file, and a strip of cloth secured on one side of the first mentioned file with which the tongue is hingedly connected and which, with said first mentioned file, constitutes an engagement for the tongue of a file on the other side thereof.

13. In a system of interlocking files, a file, a tongue hinged to the file adapted to engage with a file on one side of said file, said tongue having a part extending above the point of attachment between the tongue and the first mentioned file, and means on the said first mentioned file for engaging the tongue of a file on the other side thereof.

14. In a system of interlocking files, a paper file, a metal tongue, a strip of cloth pasted on the file provided with a slot in which the tongue is hinged, so that the parts project beyond the slot, and an engagement on said file for the tongue of another file.

15. In a system of interlocking files, a filing unit provided with a tongue and with a perforation through which is passed the tongue of another unit, and a guard on the back of the file which extends over said perforation.

16. In a system of interlocking files, a file, a separate tongue, and an attaching device for the tongue a portion of which extends within the margin of and is attached to the body of the file.

17. In a system of interlocking files, a file having a notch in its upper margin, a strip of cloth secured to the file so as to overlie the notch, a tongue hingedly connected to said strip of cloth, and an engagement for the tongue of another file.

18. In a system of interlocking files, a file having a notch in its upper margin, a strip of cloth secured to the file so as to overlie the notch and having a slot therein, a tongue hingedly mounted in said slot, and an engagement for the tongue of another file.

19. In a system of interlocking files, a file having a notch in its upper margin, a strip of cloth secured to the back of the file so as to overlie the notch and provided with a slot, a tongue hinged in the slot, and shoulders on the tongue which prevent it from detachment from said strip of cloth.

20. In a system of interlocking files, a file having a notch in its upper margin, a strip of cloth secured to the back of the file so as to overlie the notch, and a tongue hinged in said strip of cloth, the strip of cloth being free from the file in the middle, so as to leave a space for the tongue of another file.

21. In a system of interlocking files, a file, a tab projecting from the file by means of which the file may be handled, a tongue non-integral therewith hinged to said tab, and an engagement for the tongue of another file.

22. In a system of interlocking files, a filing unit provided with a slot; a separate tongue which projects through said slot provided with means for preventing it from slipping out of the slot; and means for engaging a tongue on another file.

23. In a system of interlocking files, a filing unit having a perforation therethrough and provided on the back with a pocket consisting of a strip of cloth pasted to said file, which pocket is adapted to receive an engaging tongue of another file when passed through said perforation.

TRIGG WALLER.

Witnesses:
P. H. TRUMAN,
G. Y. SKINNER.

Corrections in Letters Patent No. 972,302.

It is hereby certified that in Letters Patent No. 972,302, granted October 11, 1910, upon the application of Trigg Waller, of Highland Park, Illinois, for an improvement in "Systems of Files," errors appear in the printed specification requiring correction as follows: Page 3, line 126, the word "at" should read *an;* page 4, line 2, the word "of" should read *for;* and that the said Letters Patent should be read with these corrections therein that the same may conform to the record of the case in the Patent Office.

Signed and sealed this 1st day of November, A. D., 1910.

[SEAL.]                              E. B. MOORE,

*Commissioner of Patents.*